(12) United States Patent
Yamada et al.

(10) Patent No.: US 11,996,119 B2
(45) Date of Patent: May 28, 2024

(54) END-OF-TALK PREDICTION DEVICE, END-OF-TALK PREDICTION METHOD, AND NON-TRANSITORY COMPUTER READABLE RECORDING MEDIUM

(71) Applicant: NIPPON TELEGRAPH AND TELEPHONE CORPORATION, Tokyo (JP)

(72) Inventors: Setsuo Yamada, Tokyo (JP); Yoshiaki Noda, Tokyo (JP); Takaaki Hasegawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 484 days.

(21) Appl. No.: 17/268,559

(22) PCT Filed: Aug. 14, 2019

(86) PCT No.: PCT/JP2019/031938
§ 371 (c)(1),
(2) Date: Feb. 15, 2021

(87) PCT Pub. No.: WO2020/036195
PCT Pub. Date: Feb. 20, 2020

(65) Prior Publication Data
US 2021/0312944 A1 Oct. 7, 2021

(30) Foreign Application Priority Data
Aug. 15, 2018 (JP) ................................ 2018-152892

(51) Int. Cl.
*G10L 25/78* (2013.01)
*G06F 40/166* (2020.01)
(Continued)

(52) U.S. Cl.
CPC ............ *G10L 25/78* (2013.01); *G06F 40/166* (2020.01); *G06N 20/00* (2019.01); *G10L 15/26* (2013.01);
(Continued)

(58) Field of Classification Search
CPC ....... G10L 15/02; G10L 25/87; G10L 15/063; G06F 16/90344
See application file for complete search history.

(56) References Cited

U.S. PATENT DOCUMENTS 6,718,325 B1 * 4/2004 Chandra ........... G06F 16/90344
6,873,953 B1 * 3/2005 Lennig .................... G10L 25/87
704/E11.005

(Continued)

OTHER PUBLICATIONS

Fan, Rong-En, et al., "Liblinear: A Library for Large Linear Classification," Journal of Machine Learning Research 9 (2008) 1871-1874, Published Aug. 2008.

*Primary Examiner* — Feng-Tzer Tzeng

(57) ABSTRACT

The end-of-talk prediction device (10) of the present invention comprises: a divide unit (11) for dividing, using delimiter symbols indicating delimitations within segments, a string in which the utterance in the dialog has been text-converted by speech recognition, the delimiter symbols included in the result of the speech recognition; and an end-of-talk prediction unit (12) for predicting, using an end-of-talk prediction model (14), whether the utterance corresponding to the divided string divided by the divide unit (11) is an end-of-talk utterance of the speaker.

20 Claims, 4 Drawing Sheets

(51) Int. Cl.
  *G06N 20/00* (2019.01)
  *G10L 15/26* (2006.01)
  *G10L 25/87* (2013.01)
  *G06F 16/903* (2019.01)
  *G10L 15/02* (2006.01)
  *G10L 15/06* (2013.01)

(52) U.S. Cl.
  CPC ........ *G06F 16/90344* (2019.01); *G10L 15/02* (2013.01); *G10L 15/063* (2013.01); *G10L 25/87* (2013.01)

(56) References Cited

U.S. PATENT DOCUMENTS

| | | | |
|---|---|---|---|
| 8,554,564 B2* | 10/2013 | Hetherington | G10L 25/87 704/215 |
| 2004/0204939 A1* | 10/2004 | Liu | G10L 15/28 704/239 |
| 2005/0256711 A1* | 11/2005 | Lahti | G10L 25/87 704/E11.005 |
| 2006/0080098 A1* | 4/2006 | Campbell | G10L 15/063 704/243 |
| 2010/0023331 A1* | 1/2010 | Duta | G10L 15/1822 704/275 |
| 2016/0148610 A1* | 5/2016 | Kennewick, Jr. | G10L 15/18 704/240 |

* cited by examiner

FIG. 3

| SO A POSTCARD WITH BANK TRANSFER GUIDANCE HAS ARRIVED, THEN, I WILL CONFIRM THE DETAILS OF THE CONTRACT, GIVE ME YOUR NAME PLEASE. | "SO A POSTCARD WITH BANK TRANSFER GUIDANCE HAS ARRIVED," CANNOT BE ASCERTAINED AS AN END-OF-TALK. |

END-OF-TALK PREDICTION DEVICE, END-OF-TALK PREDICTION METHOD, AND NON-TRANSITORY COMPUTER READABLE RECORDING MEDIUM

CROSS-REFERENCE TO RELATED APPLICATIONS

This application is a U.S. 371 Application of International Patent Application No. PCT/JP2019/031938, filed on 14 Aug. 2019, which application claims priority to and the benefit of JP Application No. 2018-152892, filed on 15 Aug. 2018, the disclosures of which are hereby incorporated herein by reference in their entireties.

TECHNICAL FIELD

The present invention relates to an end-of-talk prediction device, end-of-talk prediction method, and program for predicting whether an utterance in a dialog between more than one speaker is an end-of-talk utterance of a speaker.

BACKGROUND

Systems which analyze the results of speech recognition of the utterances in a dialog between a customer and a service person in a contact center and the like, and provide responses based on the analysis results, are being considered. In such systems, by detecting the end-of-talk of the speaker, processing for responding and utterance classification, and the like, can be appropriately implemented depending on the utterance content up until the end-of-talk of the speaker.

As a method of predicting whether an utterance in a dialog between more than one speaker, such as a customer and a service person, is an end-of-talk utterance of a speaker, a method for creating learning data to which information regarding whether an utterance in a dialog is an end-of-talk utterance is appended, is envisioned. In this method, an end-of-talk prediction model for predicting whether the utterance in a dialog is an end-of-talk utterance is generated via machine learning that uses the learning data to which information regarding whether an utterance in the dialog is an end-of-talk utterance is appended (see, NPL 1).

CITATION LIST

Non-Patent Literature

NPL 1: R.-E. Fan, K.-W. Chang, C.-J. Hsieh, X.-R. Wang, and C.-J. Lin. "LIBLINEAR: A library for large linear classification", Journal of Machine Learning Research, 9(2008), 1871-1874.

SUMMARY

Technical Problem

In speech recognition, when a silent interval persists for a prescribed time or longer, the utterance following this silent interval is subjected, as one processing unit, to speech recognition. That is, an utterance up until the occurrence of the silent interval of the prescribed time or longer is outputted as one speech recognition result unit. If end-of-talk is predicted according to such speech recognition result units, in a case in which an end-of-talk exists within a speech recognition result unit, that end-of-talk cannot be correctly predicted.

An objective of the present invention, made in view of the abovementioned problems, is to provide an end-of-talk prediction device, an end-of-talk prediction method, and a program for improving the accuracy of prediction of whether an utterance within a dialog is an end-of-talk utterance.

Solution to Problem

To solve the abovementioned problems, an end-of-talk prediction device of the present invention is an end-of-talk prediction device for predicting whether an utterance in a dialog between more than one speaker is an end-of-talk utterance of the speaker, comprising: a divide unit for dividing, a string in which the utterances in the dialog have been text-converted by speech recognition, using delimiter symbols indicating delimitations within segments included in the result of the speech recognition; and an end-of-talk predict unit for predicting, with respect to an utterance corresponding to a divided string obtained by dividing a text-converted string of an utterance of the dialog using delimiter symbols, and an utterance corresponding to a string obtained by concatenating consecutive divided strings in the order of utterances, whether the utterance corresponding to the divided string divided by the divide unit is an end-of-talk utterance, using an end-of-talk prediction model generated by machine learning of a learning data with information indicating whether utterances are end-of-talk utterances is appended.

To solve the abovementioned problems, the end-of-talk prediction method of the present invention is an end-of-talk prediction method in an end-of-talk prediction device for predicting whether an utterance in a dialog between more than one speaker is an end-of-talk utterance of the speaker, the method comprising: dividing a string in which the utterances in the dialog have been text-converted by speech recognition, using delimiter symbols indicating delimitations within segments included in the result of the speech recognition; and predicting, with respect to an utterance corresponding to a divided string obtained by dividing a text-converted string of an utterance of the dialog using delimiter symbols, and an utterance corresponding to a string obtained by concatenating consecutive divided strings in the order of utterances, whether the utterance corresponding to the divided string obtained by dividing the string with the delimiter symbols is an end-of-talk utterance, using an end-of-talk prediction model generated by machine learning of learning data to which information indicating whether utterances are end-of-talk utterances is appended.

Further, to solve the abovementioned problems, a program pertaining to the present invention causes a computer to function as the abovementioned end-of-talk prediction device.

Advantageous Effect

According to the end-of-talk prediction device, the end-of-talk prediction method, and the program according to the present invention, the accuracy of prediction of whether an utterance within a dialog is an end-of-talk utterance can be improved.

BRIEF DESCRIPTION OF THE DRAWINGS

In the accompanying drawings:

FIG. 3 is a diagram for explaining a case in which the end-of-talk utterance cannot be correctly predicted from the speech recognition result.

DETAILED DESCRIPTION

Figure 1:
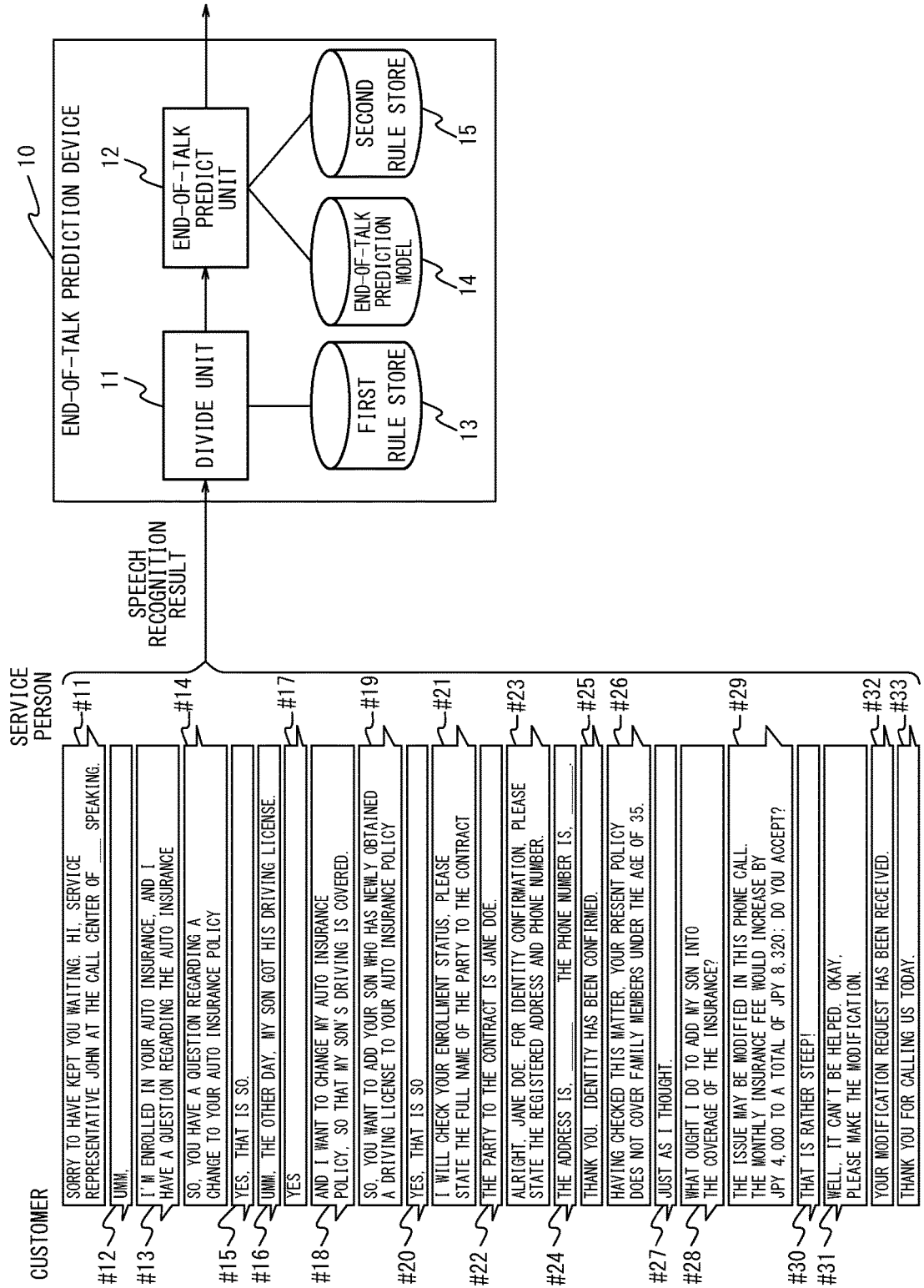
FIG. 1 is a schematic diagram of an example configuration of an end-of-talk prediction device according to an embodiment of the present invention.

Hereinafter, embodiments of the present invention will be described with reference to the drawings. In each of the diagrams, the same reference numerals indicate the same or equivalent constituent elements.

FIG. 1 is a schematic diagram of an example configuration of the end-of-talk prediction device 10 according to an embodiment of the present invention. The end-of-talk prediction device 10 according to the present embodiment predicts whether an utterance in a dialog between more than one speaker, such as that of a dialog between a customer and a service person in a contact center, is an end-of-talk utterance in which the speaker has finished speaking the content that the speaker wanted to convey. Hereinafter, explanation will be given regarding an example in which it is predicted whether an utterance in the dialog between the customer and the service person is an end-of-talk utterance.

The end-of-talk prediction device 10 of FIG. 1 comprises a divide unit 11, an end-of-talk predict unit 12, a first rule store 13, and a second rule store 15.

The utterances in the dialog between the customer and the service person that have been text-converted via speech recognition are inputted to the divide unit 11. Here, utterances of the customer and utterances of the service person are inputted in different channels (two channels) to a speech recognition processor (not shown) for performing recognition that discriminates between utterances of the customer and utterances of the service person, and performs speech recognition.

As stated above, according to the speech recognition, when a silent interval persists for a prescribed time or longer, the utterance following the last utterance of the previous speech recognition processing unit and preceding that silent interval is subjected, as one processing unit, to speech recognition, and the speech recognition result for that processing unit it output. Further, according to the speech recognition, where a silent interval persists for a prescribed time that is shorter than the silent interval set in order to demarcate the abovementioned processing unit, in the speech recognition result, delimiter symbols for indicating delimitations within segments such as punctuation are placed at the positions corresponding to the silent interval. Moreover, the particular type of delimiter symbol to be placed is, for example, decided appropriately based on prior and subsequent contexts. For example, in Reference 1, an automated insertion method for insertion of punctuation into speech recognition results is described. Specifically, Reference 1 describes methods for inserting punctuation based on characteristics such as words (surface form), parts of speech, segment boundaries, modification information for immediately succeeding segments, and pauses. Further, in a case in which a different speaker initiates speaking after the cessation of speaking of a certain speaker and prior to passage of a silent interval by which placement of the delimiter symbol is predicted, the delimiter symbol may not be placed at the end of the speech recognition result of the utterance of the earlier speaker. Moreover, it is also possible to make placement of a delimiter symbol at the end of speech recognition results compulsory.

Reference 1: Y. Akita and T. Kawahara, "Automatic Insertion Based on Multiple Annotations of Commas for Lectures", Journal of Information Processing Society of Japan, Vol. 54, No. 2, pp. 463-470, 2013.

Hereinafter, as shown in FIG. 1, with respect to the dialog between the customer and service person, it will be assumed that utterances #11 to #33 have been made, and that speech recognition has been performed. In FIG. 1, it is shown that utterances #11, 14, 17, 19, 21, 23, 25, 26, 29, 32, and 33 are the utterances of the service person, and utterances #12, 13, 15, 16, 18, 20, 22, 24, 27, 28, 30, and 31 are utterances of the customer. Further, in FIG. 1, each speech balloon represents a speech recognition processing unit.

The speech recognition results for each of the processing units (hereinafter, "speech recognition result units") are inputted into the divide unit 11. In the example of FIG. 1, the speech recognition results of each of the utterances #11 to #33 are inputted, as speech recognition result units, into the divide unit 11.

The divide unit 11 divides, based on a rule stored beforehand in the first rule store 13 (hereinafter, "first rule"), the strings indicated by the inputted speech recognition result units (i.e. text-converted strings obtained from the speech recognition on the utterances in the speech recognition processing units). The first rule can, for example, be a rule according to which the portion up until the appearance of a delimiter symbol indicating a delimitation within the segment is divided as a single unit. The delimiter symbols include Japanese commas ( 、), Japanese periods ( 。), commas (,), periods (.), line feed/white space, exclamation points (!), question marks (?), colons (:), semicolons (;), ellipses (2 point ellipsis (. .), three point ellipsis ( . . . ), and the like), brackets (round brackets (( )), square brackets ([ ]), and the like), quotation marks ([ ] " "), bullet point symbols ("*", "•", and the like), silent interval indicative symbols (<sp> (short pause)), emoji and the like. These delimiter symbols indicate delimitations within segments that, on a segment-wise or intra-segment-word-wise basis, delimit the strings text-converted by speech recognition. The divide unit 11, based on this rule, divides the string in which the utterance in the dialog has been text-converted by speech recognition, and outputs this to the end-of-talk predict unit 12. Hereinafter, each string obtained from the divide unit 11 dividing a text-converted string resulting from speech recognition on utterances in the dialog will be referred to as a divided string.

In the example of FIG. 1, the divide unit 11 divides the string obtained from speech recognition of the utterance #13 "I'm enrolled in your auto insurance, and I have a question regarding the auto insurance" into the strings "I'm enrolled in your auto insurance," and "and I have a question regarding the auto insurance", and this is outputted to the end-of-talk predict unit 12.

The end-of-talk predict unit 12, using the end-of-talk prediction model 14, predicts whether the utterance corresponding to the divided string outputted from the divide unit 11 is an end-of-talk utterance of the speaker.

The end-of-talk prediction model 14 is a model generated by machine learning of learning data to which information (a training signal) regarding whether utterances are end-of-talk utterances is appended, with respect to utterances corresponding to divided strings obtained by dividing a text-converted string of utterances in the dialog using the delimiter symbols, and utterances corresponding to strings obtained by concatenating, in the order of utterances, consecutive divided strings.

Figure 2:
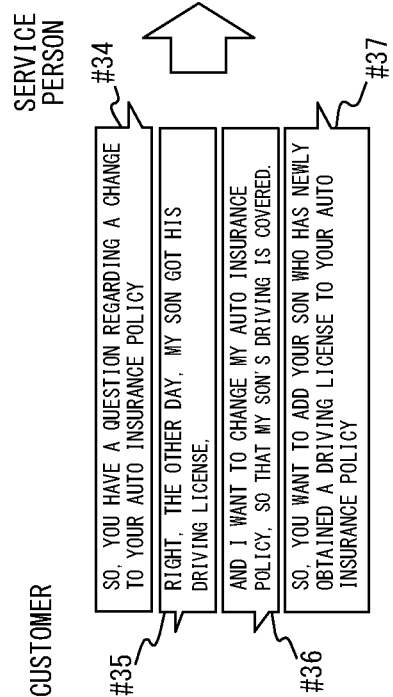
FIG. 2 is a diagram for explaining learning data used for generation of an end-of-talk prediction model shown in FIG. 1.

FIG. 2 shows an example of learning data used for the machine learning of the end-of-talk prediction model 14. Hereinafter, the example being explained concerns learning data generated based on utterances #34 to #37 shown in FIG. 2. Further, for example, in the description below, explanation is provided regarding a case in which the delimiter symbols are punctuation.

In the example of FIG. 2, because utterance #34 does not include punctuation, a training signal is added to the entirety of the utterance "So you have a question regarding a change to your auto insurance policy" of utterance #34. The prediction of whether an utterance is an end-of-talk utterance can be performed, for example, by predicting whether speaker turn taking has happened after that utterance. In general, in a dialog between a customer and a service person, dialog structures in which, after the customer finishes voicing the inquiry content, the service person voices a reply in response to that inquiry, and after the service person finishes voicing the reply, the customer makes further queries, is common. That is, when speaker turn taking happens, the utterance immediately prior to the speaker turn taking tends to be an end-of-talk utterance of the speaker prior to the speaker turn taking. Thus, in a case in which speaker turn taking has happened subsequent to an utterance, it can be predicted that there is a high probability of that that utterance is an end-of-talk utterance. Utterance #35 following utterance #34 of the service person is an utterance emitted by the customer. That is, subsequent to utterance #34, speaker turn taking has happened. Thus, as shown in FIG. 2, with regard to the utterance "So you have a question regarding a change to your auto insurance policy", a training signal indicating that it is an end-of-talk is added.

Further, because utterance #35 includes comma, using the comma as delimiters, it is divided into three divided strings "Right,", "the other day,", and "my son got his driving license,". Because speaker turn taking does not happen after the initial utterance "Right,", it can be predicted that the utterance "Right," is not an end-of-talk utterance. Thus, as shown in FIG. 2, with respect to the utterance "Right,", a training signal indicating that it is not an end-of-talk utterance is appended.

Next, a training signal is appended with respect to the utterance "Right, the other day," obtained by concatenating in utterance order the utterance "Right," and the utterance "the other day," following the utterance "Right,". As there is no speaker turn taking after the utterance of "Right, the other day,", it can be predicted that the utterance "Right, the other day," is not an end-of-talk utterance. Thus, as shown in FIG. 2, with respect to the utterance "Right, the other day,", a training signal indicating that it is not an end-of-talk utterance is added. Thereafter, in a similar manner, a training signal (i.e. a training signal indicating that it is not an end-of-talk utterance) is appended to utterances obtained by concatenating, in the order of utterances, divided strings until an end-of-talk utterance occurs.

In the example shown in FIG. 2, speaker turn taking happens after utterance #36. Thus, as shown in FIG. 2, a training signal indicative of an end-of-talk utterance is added to the utterance "Right, the other day, my son got his driving license, and I want to change my auto insurance policy, so that my son's driving is covered." obtained by concatenating utterances following the previous speaker turn taking (i.e. the speaker turns from the service person to the customer) up until the current speaker turn taking (i.e. the speaker turns from the customer to the service person).

The end-of-talk prediction model 14 can be generated by performing machine learning on learning data such as that shown in FIG. 2.

For example, the end-of-talk prediction model 14 takes, in the order of utterances, divided strings subsequent to the previous end-of-talk utterance as divided strings of the prediction target, and from among words forming the string obtained by concatenating in the order of utterances the divided strings subsequent to the previous end-of-talk utterance up until the divided string targeted for prediction, predict whether the utterance corresponding to the divided string of the prediction target is an end-of-talk utterance based on a predetermined number of words from the tail. That is, the end-of-talk prediction model 14, from among words forming a string obtained by concatenating, in the order of utterances, the divided strings subsequent to the previous end-of-talk utterance up until the divided string of a prediction target, predicts whether the utterance corresponding to the divided string of the prediction target is an end-of-talk utterance based on a predetermined number of words from the tail.

Further, the end-of-talk prediction model 14, based on a string obtained by concatenating in the order of utterances the divided strings subsequent to the previous end-of-talk utterance up until the divided string of a prediction target, may predict whether the utterance corresponding to the divided string of the prediction target is an end-of-talk utterance. That is, the end-of-talk prediction model 14, based on the entirety of the string obtained by concatenating, in the order of utterances, the divided strings subsequent to the previous end-of-talk utterance up until the divided string of a prediction target, may predict whether the utterance corresponding to the divided string of the prediction target is an end-of-talk utterance.

Further, the end-of-talk prediction model 14 may predict, based on at least one of a notation of the word included in the divided string or a part of speech of the word included the divided string, whether the utterance corresponding to the divided string is an end-of-talk utterance. In this case, for example, the part of speech of the word included in the divided string can be identified via morphological analysis.

Hereinafter, prediction of whether the utterance corresponding to the divided string is an end-of-talk utterance, based on the parts of speech of the words included the divided string, will be explained. Moreover, hereinafter, the results of morphological analysis will be indicated by word notation and its part of speech, and slash (/) annotated word notation delimitation.

For example, the result of morphological analysis of the string "you have a question" would be: "you (pronoun)/have (verb)/a (article)/question (noun)". Further, the morphological analysis result of the string "Right, the other day" would be "Right (interjection)/, (symbol)/the (article)/other (adjective)/day (noun)".

For example, in a case in which machine learning is to be performed using the notation and parts of speech of the last four words of the segment, the above notation and parts of speech and training data is inputted and an end-of-talk prediction model is created. The training data for the morphological analysis result of "you (pronoun)/have (verb)/a (article)/question (noun)" is "is an end-of-talk", and the training data for the morphological analysis result of "Right (interjection)/, (symbol)/the (article)/other (adjective)/day (noun)" is "is not an end-of-talk". By using models created using learning data like this, for example, in a case in which the part of speech of the final word of the divided string is a noun, it can be predicted that the utterance corresponding to that divided string is not an end-of-talk utterance.

As mentioned above, various methods may be conceived as the prediction method of the end-of-talk prediction model 14. The end-of-talk prediction model 14 can be generated by machine learning of learning data in accordance with the prediction method. Moreover, with regards to machine learning taking as its input natural language, a support vector machine (SVM), for example, can be used.

Referring again to FIG. 1, the end-of-talk prediction unit 12 can, based on the prediction result of the end-of-talk prediction model 14 and the prediction result regarding whether, based on a rule stored beforehand in the second rule store 15 (hereinafter, "second rule"), the utterance corresponding to the divided string is an end-of-talk utterance, predict whether the utterance corresponding to the divided string is an end-of-talk utterance.

For example, as the second rule, a rule may be envisioned in which, for example, it is stipulated that in a case in which speaker turn taking has happened subsequent to the utterance corresponding to the divided string, the utterance corresponding to that divided string is an end-of-talk utterance. For this rule, the end-of-talk prediction unit 12 would, in a case in which speaker turn taking has happened subsequent to the utterance corresponding to the divided string, predict that the utterance corresponding to that divided string is an end-of-talk utterance.

Further, as the second rule a rule may be envisioned in which, for example, it is stipulated that in a case in which subsequent to the utterance corresponding to the divided string, there is no next utterance for a prescribed time, the utterance corresponding to that divided string is an end-of-talk utterance. In general, in a case in which subsequent to the utterance of the speaker there is no next utterance for a prescribed time or more, there is a tendency that it is likelier that the speaker has finished speaking and is waiting for a response from the other speaker. Thus, for this rule, the end-of-talk prediction unit 12 would, in a case in which, subsequent to the utterance corresponding to the divided string, there is no next utterance for a prescribed time or more, predict that the utterance corresponding to that divided string is an end-of-talk utterance.

Further, as the second rule, a rule may be envisioned in which, for example, it is predicted that the utterance corresponding to the divided string of the prediction target is not an end-of-talk utterance in a case in which the word count of the string obtained by concatenating, in the order of utterances, the divided strings subsequent to the previous end-of-talk utterance up until the divided string of the prediction target is equal to or less than a prescribed number. For this rule, the end-of-talk prediction unit 12 predicts that the utterance corresponding to the divided string of the prediction target is not an end-of-talk utterance in a case in which the word count of the string obtained by concatenating in the order of utterance the divided strings subsequent to the previous end-of-talk utterance up until the divided string of the prediction target is equal to or less than a prescribed number.

Then, the end-of-talk prediction unit 12, in a case in which, for example, the prediction result of the end-of-talk prediction model 14 and the prediction result based on the second rule both indicate that the utterance corresponding to the divided string is an end-of-talk utterance, predicts that the utterance corresponding to that divided string is an end-of-talk utterance. Alternatively, the end-of-talk prediction unit 12, in a case in which at least one of the prediction result of the end-of-talk prediction model 14 or the prediction result based on the second rule indicates that the utterance corresponding to the divided string is an end-of-talk utterance, may predict that the utterance corresponding to that divided string is an end-of-talk utterance. Alternatively, the end-of-talk prediction unit 12, in a case in which at least one of the prediction result of the end-of-talk prediction model 14 or the prediction result based on the second rule indicates that the utterance corresponding to the divided string is not an end-of-talk utterance, may predict that the utterance corresponding to that divided string is not an end-of-talk utterance.

As mentioned above, when end-of-talk prediction is performed according to speech recognition result units, cases in which end-of-talk utterances are not correctly identified may arise. Such cases will be explained with reference to FIG. 3.

In FIG. 3, speech recognition is performed on the utterance "So a postcard with bank transfer guidance has arrived, then, I will confirm the details of the contract, give me your name please." as a single processing unit, and outputted as a speech recognition result unit. Here, the utterance "So a postcard with bank transfer guidance has arrived," corresponds to a regard confirmation utterance for confirming the regard of the customer regarding the postcard with bank transfer guidance, and the utterance "then, I will confirm the details of the contract, give me your name please." amounts to a contract content confirmation utterance for confirming the contract content of the customer. In this manner, according to the utterance "So a postcard with bank transfer guidance . . . " and the utterance "then, I will confirm the details of the contract . . . ", the content that is being conveyed is different. Thus, the utterance "So a postcard with bank transfer guidance . . . " corresponds to an utterance of an end-of-talk utterance in which the speaker (service person) has finished uttering the content they want to convey (regard confirmation). However, when the utterance "So a postcard with bank transfer guidance . . . " and the utterance "then, I will confirm the details of the contract . . . " are uttered with virtually no interval between them, speech recognition may output these utterances as a single speech recognition result unit. In this case, as end-of-talk utterance prediction will only be carried out for the speech recognition result unit of "So a postcard with bank transfer guidance . . . give me your name please." and it is not possible for the utterance "So a postcard with bank transfer guidance has arrived," to be predicted as an end-of-talk utterance.

Figure 4:
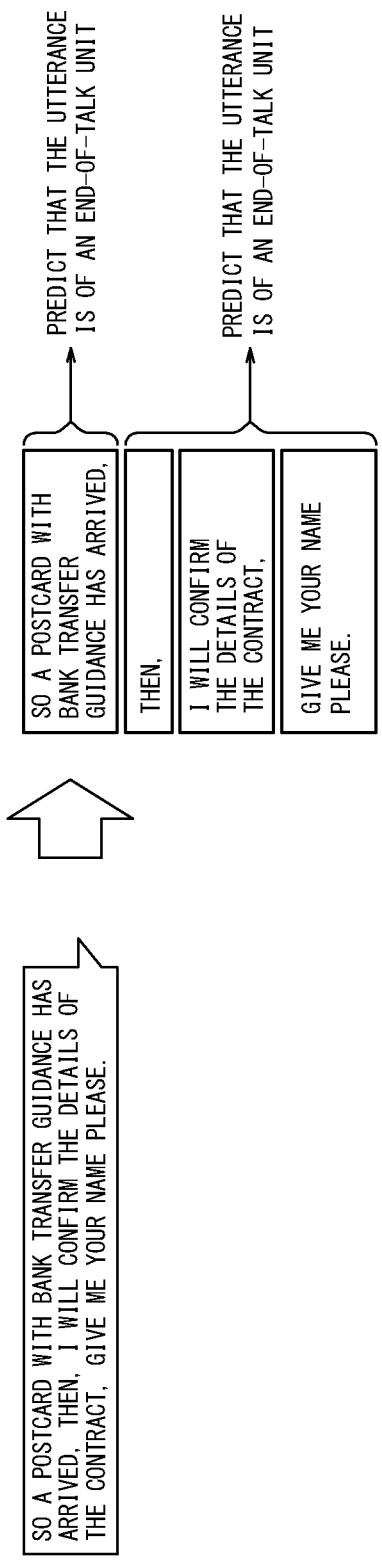
FIG. 4 is a diagram for explaining an end-of-talk prediction method of the end-of-talk prediction device shown in FIG. 1.

FIG. 4 is a diagram for explaining the end-of-talk prediction method of the end-of-talk prediction device 10 according to the present embodiment. In FIG. 4, in a manner similar to FIG. 3, speech recognition is performed on the utterance "So a postcard with bank transfer guidance . . . give me your name please." as a single processing unit, and outputted as a speech recognition result unit.

As mentioned above, in the present embodiment, the divide unit 11 divides, using punctuation, i.e. delimiter symbols such that they are included in the speech recognition results and are indicative of delimitations within segments, the string in which the utterance in the dialog has been text-converted by speech recognition. Thus, as shown in FIG. 4, the divide unit 11 divides the string "So a postcard with bank transfer guidance . . . give me your name please."

into the four divided strings: "So a postcard with bank transfer guidance has arrived,", "then,", "I will confirm the details of the contract,", and "give me your name please.".

The end-of-talk prediction unit 12, using the end-of-talk prediction model 14 and the like, predicts whether the utterance corresponding to the initial divided string "So a postcard with bank transfer guidance has arrived," divided by the divide unit 11 is an end-of-talk utterance. In a case in which the end-of-talk prediction unit 12 predicts that the utterance corresponding to the divided string "So a postcard with bank transfer guidance has arrived," is an end-of-talk utterance, the utterance "So a postcard with bank transfer guidance has arrived," is outputted as an utterance of an end-of-talk unit. By predicting, by divided string units, whether the utterance corresponding to the divided string is an end-of-talk utterance, end-of-talk utterances may be identified for a case in which the speaker's end-of-talk is included in the speech recognition result unit.

Next, the end-of-talk prediction unit 12 predicts whether the utterance corresponding to the next divided string "then," is an end-of-talk utterance. Once the end-of-talk prediction unit 12 predicts that the utterance "then," is not an end-of-talk utterance, it predicts whether the utterance "then, I will confirm the details of the contract," obtained by concatenating the divided string "then," with the next divided string "I will confirm the details of the contract,", is an end-of-talk utterance. In a case in which the end-of-talk prediction unit 12 predicts that the utterance "then, I will confirm the details of the contract," is not an end-of-talk utterance, it is predicted whether the utterance "then, I will confirm the details of the contract, give me your name please.", obtained by concatenating the string of the former and the subsequent divided string "give me your name please.", is an end-of-talk utterance. Once the end-of-talk prediction unit 12 predicts that the utterance "then, I will confirm the details of the contract, give me your name please." is an end-of-talk utterance, it outputs the utterance "then, I will confirm the details of the contract, give me your name please." as an utterance of an end-of-talk unit.

Though it has been explained, with respect to the present embodiment, that the delimiter symbols may, for example, be punctuation, as mentioned above, the delimiter symbols may include various symbols indicating delimitations within segments, such as commas, periods, line feeds, white space, exclamation points, question marks, colons, semicolons, ellipses, brackets, quotation marks, bullet point symbols, silent interval indicative symbols, and emoji.

Thus, in a case in which the string that is text-converted by speech recognition is "Right <sp> the other day <sp> my son got his driving license <sp>", the divide unit 11 would divide the string at the symbols indicating the silent intervals (i.e. <sp>). That is, the divide unit 11 would divide it into the divided string "Right <sp>", the divided string "the other day <sp>", and the divided string "my son got his driving license <sp>".

Further, in a case in which the string that is text-converted by speech recognition is "yes, my son took a driver's license a few days ago.", the divide unit 11 performs division based on commas and/or periods. That is, the divide unit 11 divides it into the divided string "yes," and the divided string "my son took a driver's license a few days ago.".

Further, for example, it is assumed that the strings text-converted by speech recognition are strings that include bullet points as follows.

"The following documents are necessary:
a residence certificate
a seal-impression certificate
In this case, the divide unit 11 performs division on the string at the colon (:) and the symbol indicating bullet point items (*). The delimiter symbols can be registered in the first rule store 13 separately as a head delimiter symbol and a tail delimiter symbol, and a rule stipulating that, for the head delimiter symbol, division is performed in front of the delimiter symbol; and for the tail delimiter symbol, division is performed after the delimiter symbol, can be stored therein. Applying this rule, for example, to the abovementioned example, i.e. registering the (*) as a head delimiter symbol and the (:) as a tail delimiter symbol, the divide unit 11 would divide it into the divided string "The following documents are necessary:", the divided string "* a residence certificate", and the divided string "* a seal-impression certificate".

Further, in a case in which the string text-converted by speech recognition is "The following is what I would like to know; new address, and telephone number.", the divide unit 11 divides the string at the semicolon, comma, and period. That is, the divide unit 11 divides it into the divided string "The following is what I would like to know;", the divided string "new address,", and the divided string "and telephone number.".

Further, in a case in which the string text-converted by speech recognition is "Regarding the address . . . I've recently relocated.", the divide unit 11 divides the string at the ellipsis and the period. That is, the divide unit 11 divides it into the divided string "Regarding the address . . . " and the divided string "I've recently relocated.".

Further, in a case in which the string text-converted by speech recognition is "A document allowing identification of the party to the contract is required. (For example, a driving license or the like)" the divide unit 11 divides the string at the parenthesis, comma, and period. An open parenthesis (( ) as a head delimiter symbol, and a close parenthesis ( )), a comma (,), and a period (.) as tail delimiter symbols, and a rule stipulating that, for the head delimiter symbol, division is performed in front of the delimiter symbol; and for the tail delimiter symbol, division is performed after the delimiter symbol, can be stored in the first rule store 13. By applying this rule to the abovementioned example, the divide unit 11 divides it into the divided string "A document allowing identification of the party to the contract is required.", the divided string "(For example,", and the divided string "a driving license or the like)".

Further, in a case in which the string text-converted by speech recognition is "My friend said that "'modification prior to maturity is not possible" apparently'.", the divide unit 11 divides the string at the single quotation mark ('), the open double quotation mark ("), the closing double quotation mark ("), and the period (.). An open double quotation mark (") as a head delimiter symbol, and a close double quotation mark ("), a comma (,), and a period (.) as tail delimiter symbols, and a rule stipulating that, for the head delimiter symbol, division is performed in front of the delimiter symbol; for the tail delimiter symbol, division is performed after the delimiter symbol; and in a case in which same-attribute head delimiter symbols or tail delimiter symbols consecutively appear, for the head delimiter symbols, division is performed in front of the initial head delimiter symbol, and, for the tail delimiter symbols, division is performed after the final tail delimiter symbol, can be stored in the first rule store 13. Further, into the first rule store 13 may be recorded the appearance count of the delimiter symbol ("), and into it is stored a rule in which: in a case in which the appearance count is odd, that delimiter symbol is treated as a head delimiter symbol; and in a case in which the appearance count is even, that delimiter symbol is treated as a tail delimiter symbol. That is, as the initial appearance of the delimiter symbol (") is deemed a head delimiter symbol, the ("") is deemed a consecutive appearance of head delimiter symbols, and the delimiter symbol (") appearing the next time is deemed a tail delimiter symbol. Applying this rule, to the abovementioned example, the divide unit 11 divides it into the divided string "My friend has said that", the divided string """modification prior to maturity is not possible"", and "apparently'.". Further, in a case in which the same symbol, for example, an em dash (—), is repeated, an exceptional rule may be provided to treat it, in accordance to whether it is a head delimiter symbol or a tail delimiter symbol, as singly-chunked symbol.

Further, where the string that is text-converted by speech recognition is "Though the relocation was half a year ago, it is fortunate that the change made it in time (^^)", the divide unit 11 divides the string at the comma and the emoji. That is, the divide unit 11 divides it into the divided string "Though the relocation was half a year ago," and the divided string "it is fortunate that the change made it in time (^^)".

As explained in the present embodiment, the end-of-talk prediction device 10 comprises: a divide unit 11 for dividing a string in which the utterances in the dialog have been text-converted by speech recognition, using delimiter symbols indicating delimitations within segments included in the result of the speech recognition; and an end-of-talk prediction unit 12 for predicting, whether the utterance corresponding to the divided string divided by the divide unit 11 is an end-of-talk utterance of the speaker, using an end-of-talk prediction model 14.

By using the end-of-talk prediction model 14 to predict whether the utterance corresponding to the divided string obtained by dividing the text-converted string of an utterance of the dialog using the delimiter symbols, it becomes possible to improve the accuracy of end-of-talk utterance prediction because even if an end-of-talk utterance is included in the speech recognition result unit, it would still be possible to identify that end-of-talk utterance.

The end-of-talk prediction device 10 has been explained above but it should be noted that a computer can be used to function as the end-of-talk prediction device 10. Such a computer may be realized by storing a program that defines the procedures for realizing the respective functions of the end-of-talk prediction device 10 in a memory of the computer, and causing a CPU of the computer to read out and execute the program.

Further, the program may be recorded on a computer readable recording medium. By using such a recording medium, the program can be installed on a computer. Here, the recording medium on which the program is recorded may be a non-transitory recording medium. Though the non-transitory recording medium is not particularly limited, it, for example, may be a recording medium such as a CD-ROM and/or a DVD-ROM etc.

Although the above embodiments have been described as typical examples, it will be evident to skilled person that many modifications and substitutions are possible within the spirit and scope of the present invention. Therefore, the present invention should not be construed as being limited by the above embodiments, and various changes and modifications and the like can be made without departing from the claims. For example, it is possible to combine a plurality of constituent blocks described in the configuration diagram of the embodiment into one, or to divide one constituent block.

REFERENCE SIGNS LIST 10 end-of-talk prediction device
11 divide unit
12 end-of-talk prediction unit
13 first rule store
14 end-of-talk prediction model
15 second rule store

The invention claimed is:

1. An end-of-talk prediction device for predicting whether an utterance in a dialog between more than one speaker is an end-of-talk utterance of a speaker, the end-of-talk prediction device comprising:
  a computer that
    divides a string into a plurality of segments according to delimiter symbols, wherein the string is based on utterances in the dialog have been text-converted by speech recognition, and the delimiter symbols indicate delimitations associated with segments of the string included in the result of the speech recognition, and
    predicts whether utterances are end-of-talk utterances using an end-of-talk prediction model, wherein the utterances include a first utterance corresponding to a segment of the plurality of segments, the end-of-talk prediction model is generated from machine learning according to learning data, and the learning data includes a second utterance and a training signal, the second utterance includes a string obtained by concatenating one or more consecutive segments of the plurality of segments in the order of uttering, and the training signal specifies whether the second utterance is an end-of-talk utterance.

2. The end-of-talk prediction device according to claim 1, wherein the delimiter symbols are punctuation.

3. The end-of-talk prediction device according to claim 1, wherein the end-of-talk prediction model, from among words forming a string obtained by concatenating in the order of uttering the divided strings subsequent to a previous end-of-talk utterance up until the divided string of a prediction target, predicts, whether the utterance corresponding to the divided string of the prediction target is an end-of-talk utterance based on a predetermined number of words from the tail of the utterance.

4. The end-of-talk prediction device according to claim 1, wherein the end-of-talk prediction model, based on a string obtained by concatenating in the order of utterances the divided strings subsequent to the previous end-of-talk utterance up until the divided string of a prediction target, predicts whether the utterance corresponding to the divided string of the prediction target is an end-of-talk utterance.

5. The end-of-talk prediction device according to claim 1, wherein the end-of-talk prediction model predicts, based on at least one of a notation of the divided string or a part of speech of a word included the divided string, whether the utterance corresponding to the divided string is an end-of-talk utterance.

6. The end-of-talk prediction device according to claim 1, wherein the computer performs the prediction based on a first prediction result by the end-of-talk prediction model, and a second prediction result on whether the utterance corresponding to the divided string is an end-of-talk utterance that is based on a predetermined rule.

7. The end-of-talk prediction device according to claim 6, wherein the computer predicts whether the utterance corresponding to the divided string is an end-of-talk utterance based on a rule that predicts that the utterance corresponding to the divided string of the prediction target is not an end-of-talk utterance in a case in which the word count of the string obtained by concatenating, in the order of uttering, the divided strings subsequent to the previous end-of-talk utterance up until the divided string of the prediction target is or less than a prescribed number.

8. The end-of-talk prediction device according to claim 6, wherein the computer predicts whether the utterance corresponding to the divided string is an end-of-talk utterance based on a rule that predicts that the utterance corresponding to the divided string is an end-of-talk utterance in a case in which speaker turn taking happens subsequent to the utterance corresponding to the divided string.

9. The end-of-talk prediction device according to claim 6, wherein the computer predicts whether the utterance corresponding to the divided string is an end-of-talk utterance based on a rule that predicts that the utterance corresponding to the divided string is an end-of-talk utterance in a case in which for a predetermined time or more subsequent to the utterance corresponding to the divided string there is no next utterance.

10. An end-of-talk prediction method in an end-of-talk prediction device for predicting whether an utterance in a dialog between more than one speaker is an end-of-talk utterance of a speaker, the method comprising:
dividing a string into a plurality of segments according to delimiter symbols, wherein the string is based on utterances in the dialog have been text-converted by speech recognition, and the delimiter symbols indicate delimitations associated with segments of the string included in the result of the speech recognition; and
predicting whether utterances are end-of-talk utterances using an end-of-talk prediction model, wherein the utterances include a first utterance corresponding to a segment of the plurality of segments, the end-of-talk prediction model is generated by machine learning using learning data, and the learning data includes a second utterance and a training signal, the second utterance includes a string obtained by concatenating one or more consecutive segments of the plurality of segments in the order of uttering, and the training signal specifies whether the second utterance is an end-of-talk utterance.

11. A non-transitory computer readable recording medium recording a program for causing a computer to function as the end-of-talk prediction device according to claim 1.

12. The end-of-talk prediction device according to claim 2, wherein the end-of-talk prediction model, from among words forming a string obtained by concatenating in the order of uttering the divided strings subsequent to a previous end-of-talk utterance up until the divided string of a prediction target, predicts, whether the utterance corresponding to the divided string of the prediction target is an end-of-talk utterance based on a predetermined number of words from the tail of the utterance.

13. The end-of-talk prediction device according to claim 2, wherein the computer performs the prediction based on a first prediction result by the end-of-talk prediction model, and a second prediction result on whether the utterance corresponding to the divided string is an end-of-talk utterance that is based on a predetermined rule.

14. The end-of-talk prediction device according to claim 3, wherein the computer performs the prediction based on a first prediction result by the end-of-talk prediction model, and a second prediction result on whether the utterance corresponding to the divided string is an end-of-talk utterance that is based on a predetermined rule.

15. The end-of-talk prediction device according to claim 4, wherein the computer performs the prediction based on a first prediction result by the end-of-talk prediction model, and a second prediction result on whether the utterance corresponding to the divided string is an end-of-talk utterance that is based on a predetermined rule.

16. The end-of-talk prediction device according to claim 5, wherein the computer performs the prediction based on a first prediction result by the end-of-talk prediction model, and a second prediction result on whether the utterance corresponding to the divided string is an end-of-talk utterance that is based on a predetermined rule.

17. The end-of-talk prediction device according to claim 2, wherein the computer predicts whether the utterance corresponding to the divided string is an end-of-talk utterance based on a rule that predicts that the utterance corresponding to the divided string of the prediction target is not an end-of-talk utterance in a case in which the word count of the string obtained by concatenating, in the order of uttering, the divided strings subsequent to the previous end-of-talk utterance up until the divided string of the prediction target is or less than a prescribed number.

18. The end-of-talk prediction device according to claim 3, wherein the computer predicts whether the utterance corresponding to the divided string is an end-of-talk utterance based on a rule that determines that the utterance corresponding to the divided string of the prediction target is not an end-of-talk utterance in a case in which the word count of the string obtained by concatenating, in the order of uttering, the divided strings subsequent to the previous end-of-talk utterance up until the divided string of the prediction target is or less than a prescribed number.

19. The end-of-talk prediction device according to claim 4, wherein the computer predicts whether the utterance corresponding to the divided string is an end-of-talk utterance based on a rule that predicts that the utterance corresponding to the divided string of the prediction target is not an end-of-talk utterance in a case in which the word count of the string obtained by concatenating, in the order of uttering, the divided strings subsequent to the previous end-of-talk utterance up until the divided string of the prediction target is or less than a prescribed number.

20. The end-of-talk prediction device according to claim 5,
wherein the computer predicts whether the utterance corresponding to the divided string is an end-of-talk utterance based on a rule that predicts that the utterance corresponding to the divided string of the prediction target is not an end-of-talk utterance in a case in which the word count of the string obtained by concatenating, in the order of uttering, the divided strings subsequent to the previous end-of-talk utterance up until the divided string of the prediction target is or less than a prescribed number.

* * * * *